United States Patent [19]

Lesca et al.

[11] 4,024,581
[45] May 17, 1977

[54] APPARATUS FOR WRITING ON, AND/OR READING, MAGNETIC DISCS

[75] Inventors: Piercarlo Lesca, Palazzo Canavese (Turin); Giorgio Bonzano, Ivrea (Turin), both of Italy

[73] Assignee: Ing. C. Olivetti & C., S.p.A., Ivrea (Turin), Italy

[22] Filed: Nov. 20, 1974

[21] Appl. No.: 525,736

[30] Foreign Application Priority Data

Dec. 5, 1973  Italy ............................. 70566/73
July 8, 1974  Italy ............................. 69157/74

[52] U.S. Cl. .................. 360/99; 360/106; 360/130
[51] Int. Cl.² ............... G11B 5/016; G11B 5/55; G11B 21/10
[58] Field of Search .............. 360/86, 99, 98, 97, 360/106, 130

[56]  References Cited
UNITED STATES PATENTS

| | | | |
|---|---|---|---|
| 3,678,481 | 7/1972 | Dalziel et al. | 360/97 |
| 3,684,299 | 8/1972 | Clark | 360/93 |
| 3,725,883 | 4/1973 | Bennett et al. | 360/97 |
| 3,913,137 | 10/1975 | Morgan | 360/98 |

*Primary Examiner*—Robert S. Tupper

[57]  ABSTRACT

The apparatus is used for writing on and/or reading two magnetic discs of flexible type each one contained for rotation in a protective cover provided with transducer apertures. The apparatus comprises two insertion devices on which the protective covers of the discs are inserted in manner that the discs lie substantially in two parallel planes, having the corresponding magnetizable surfaces oppositely faced therebetween. The insertion devices through corresponding counter-mandrels, causes the discs to engage a pair of driving mandrels for the rotation of the two discs. The driving mandrels and the discs are rotated in opposite senses and, between the two discs, are disposed two transducers which are jointly positioned with respect to the magnetizable surfaces of the discs along the transducer apertures.

8 Claims, 11 Drawing Figures

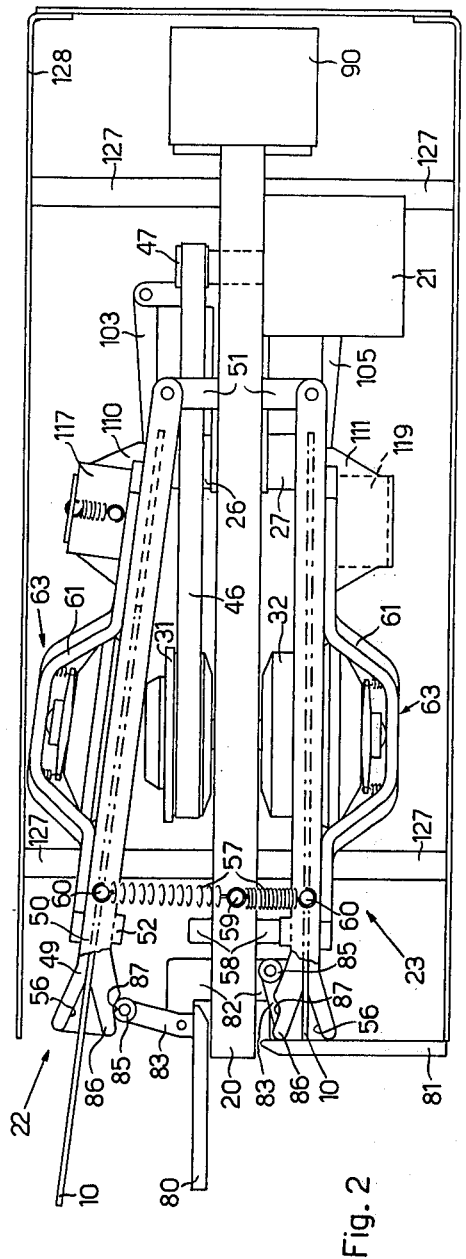
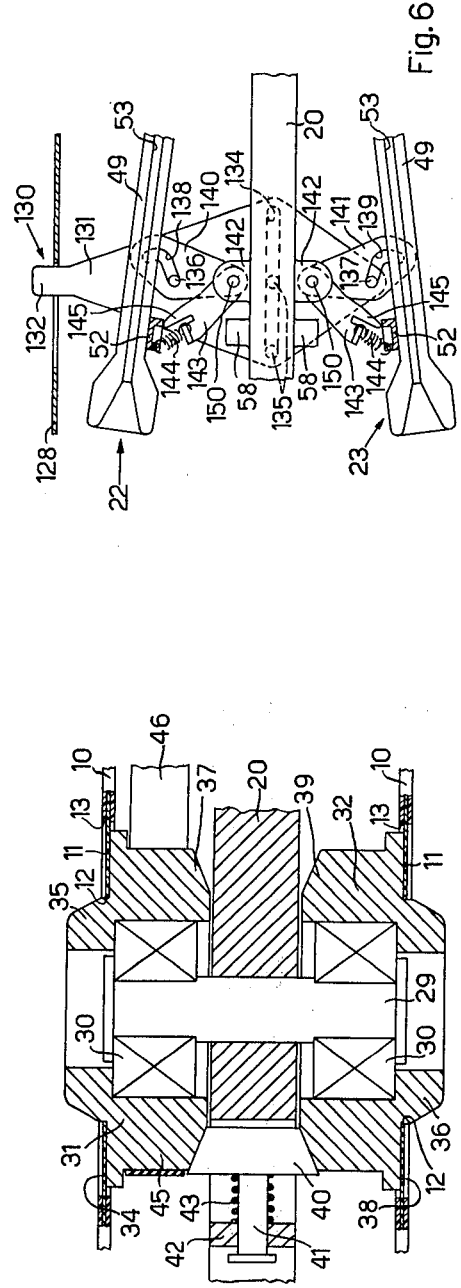

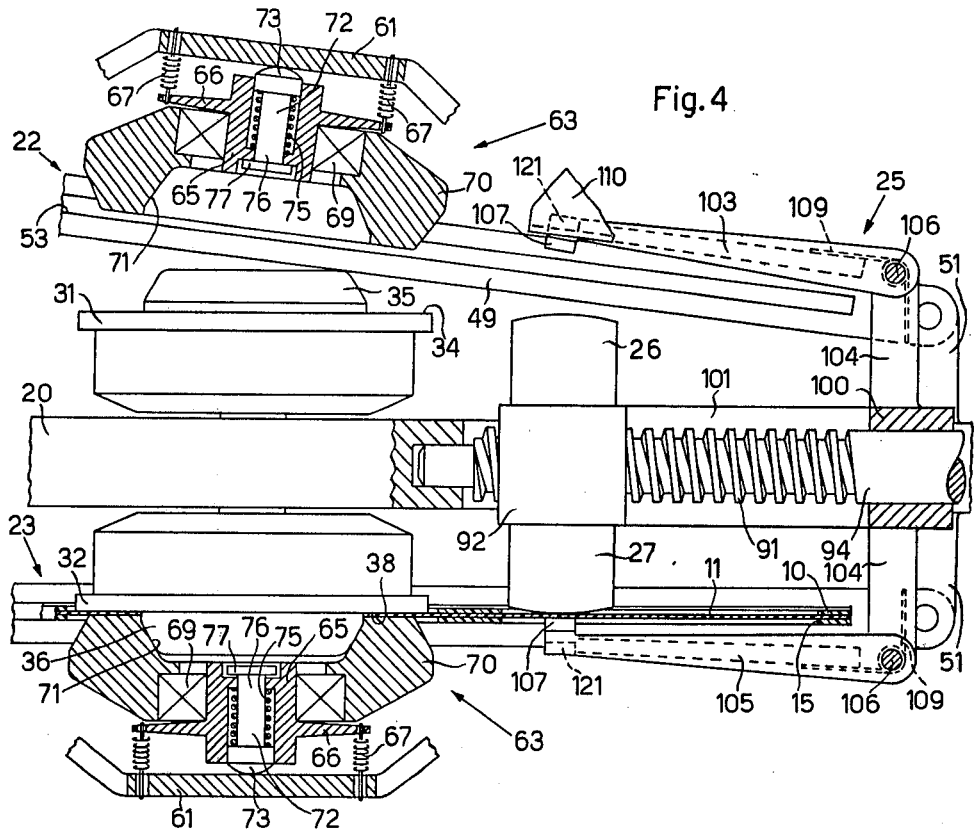
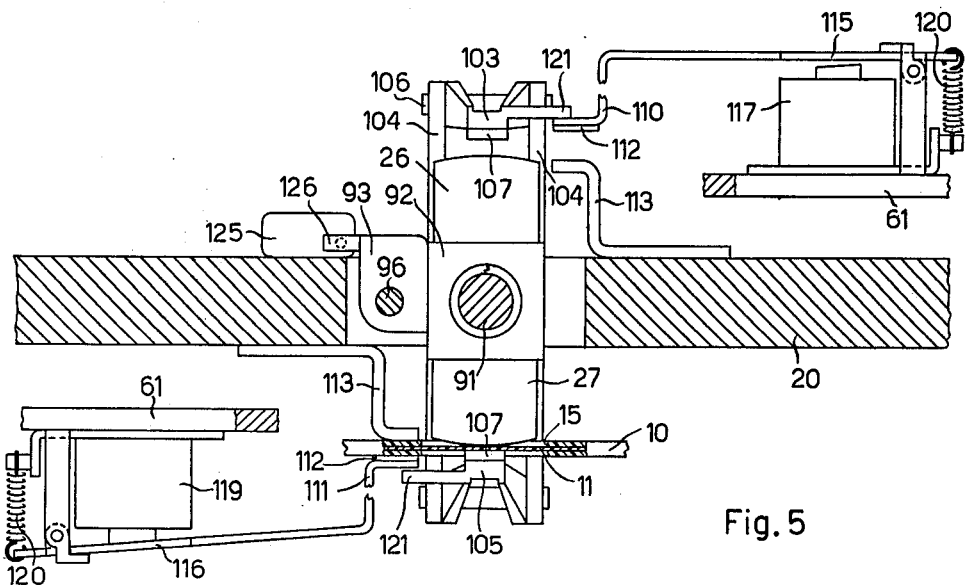

APPARATUS FOR WRITING ON, AND/OR READING, MAGNETIC DISCS

BACKGROUND OF THE INVENTION

1. Field of invention

The present invention relates to an apparatus for writing on, and/or reading, magnetic discs of flexible type each contained in its own protective outer cover.

2. Description of the prior art

These covers are normally constituted by an envelope of paperboard or plastics material. The thin magnetic disc of flexible type is arranged in the envelope and can rotate inside the envelope owing to the presence of a suitable lubricating material. Through the medium of a central hole in these envelopes it is possible to gain access to the magnetic disc from both sides to cause it to rotate with the aid of suitable drive means. The sides of the envelopes are moreover provided with a pair of opposed slots disposed radially with respect to the disc, through which access can be gained with a transducer to write on, and/or read, the disc. Moreover, by arrangement, for the purpose of making the magnetic discs interchangeable between one writing apparatus and another, the discs are normally inserted with a predetermined face turned towards a reference element of the apparatus and are caused to rotate always in the same direction with respect to the writing and/or reading elements.

SUMMARY OF THE INVENTION

An object of the present invention is to make possible writing on, and/or reading, simultaneously a plurality of flexible magnetic discs, using a common driving system and a single positioning mechanism.

Another object of this invention is to provide a compact apparatus for simultaneously writing on and/or reading two flexible magnetic discs each one contained in a protective cover, wherein these covers may be easily inserted and removed from the apparatus.

Another object of this invention is to provide an apparatus for writing on and/or reading flexible magnetic discs wherein the discs are exactly and easily positioned with respect to the driving elements.

A further object of this invention is to provide an apparatus for writing on and/or reading flexible magnetic discs wherein an ejection mechanism may eject the discs out from the insertion device after the reading and/or writing of the information thereof.

BRIEF DESCRIPTION OF THE DRAWING

The invention will be described in more detail, by way of example, with reference to the accompanying drawings, wherein:

FIG. 2 is a side view of the apparatus of FIG. 1;

FIG. 3 is an enlarged section on the line III-III of FIG. 1 showing a first detail of the apparatus;

FIG. 4 is an enlarged section showing a second detail of the apparatus of FIG. 1;

FIG. 5 is an enlarged section on the line V-V of FIG. 1 showing other details of the apparatus;

FIG. 6 is a side view, partly in section, of a possible variant of the apparatus of FIG. 1;

DESCRIPTION OF PREFERRED EMBODIMENT

Figure 7:
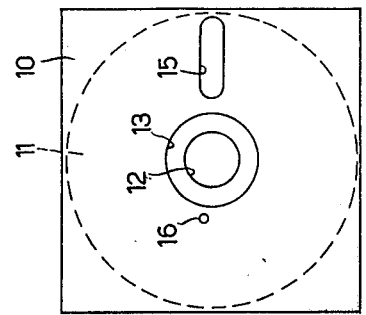
FIG. 7 is a diagrammatic plan view of a magnetic disc in its envelope.

A typical magnetic disc will firstly be described with reference to FIG. 7. A protective cover of standard type is constituted by an envelope 10 of paperboard or plastics material inside which is arranged a magnetic disc 11 of flexible type. This disc 11 can rotate within the cover 10 without being damaged owing to the presence of a suitable lubricating material known per se interposed between the disc and the cover. The disc 11 has a central hole 12 which is adapted to engage with a corresponding driving mandrel. The two sides of the cover 10 have a hole 13 larger than the hole 12 and substantially concentric therewith. The driving mandrel can thus obtain access to the disc through the hole 13 from either side of the protective outer cover.

The envelope 10 is moreover provided with a pair of opposed transducer apertures or slots 15 formed in the sides radially with respect to the disc 11 and through which a transducer can gain access to the disc to write on, and/or read, the same.

Adjacent the holes 13, there is normally formed a small synchronizing hole 16 which is adapted to co-operate with suitable detecting elements, for example of photoelectric type, to cause a zeroizing and synchronizing signal to be generated at each revolution of the disc.

Normally, these discs have one writing surface only on account of their thinness. Moreover, to ensure interchangeability of the magnetic discs between one writing apparatus and another, the discs are inserted with the writing face conventionally towards the transducer and are caused to rotate in the same direction with respect to the latter. To this end, the hole 16 is arranged dissymmetrically with respect to the slots 15, as a result of which the detecting elements are activated only if the envelope 10 is inserted in the correct position.

Figure 1:
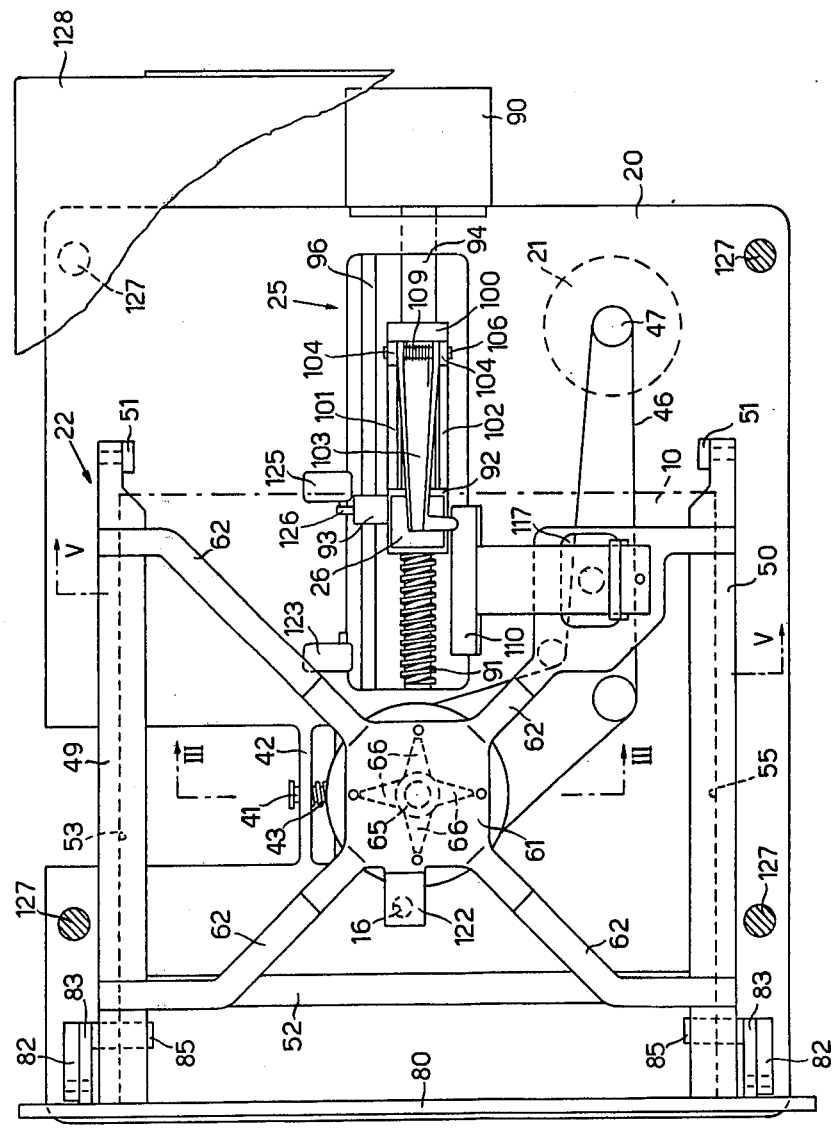
FIG. 1 is a plan view of apparatus embodying the invention.

Referring to FIGS. 1 and 2, the apparatus embodying the invention comprises a supporting frame 20 on which are mounted a motor 21 and two insertion devices 22 and 23 into each of which a disc envelope 10 containing the magnetic disc 11 can be inserted. On the frame 20 there is moreover mounted a positioning mechanism 25 adapted to position a pair of magnetic writing and/or reading transducers 26 and 27 with respect to the discs 11.

More particularly, the frame 20 consists of a substantially rectangular plate to which a through spindle 29 (FIG. 3) is fixed. On the ends of the spindle 29 are two mandrels 31 and 32 mounted rotatably by means of ball bearings 30, one of the mandrels being disposed above and the other below the frame 20. The mandrels 31 and 32 have their outer ends 35 and 36, respectively, of substantially frusto-conical form each adapted to engage with the central hole 12 of the corresponding flexible disc 11. The mandrels moreover have plane bearing surfaces 34 and 38, respectively, for the discs 11.

The inner ends 37 and 39 of the mandrels 31 and 32 are also of substantially frusto-conical form and co-operate with a reversing bevel wheel 40 disposed between the two mandrels. The wheel 40 is rotatable on a spindle 41 mounted in a crosspiece 42 of the frame 20 at right angles to the spindle 29 supporting the mandrels 31 and 32. A spring 32 compressed between the crosspiece 42 and the wheel 40 supplies to the latter the thrust necessary to ensure constant contact between its conical surface and the conical surfaces of the inner ends 37 and 39 of the mandrels 31 and 32.

A pulley 45 is formed on the upper mandrel 31 in the proximity of its inner end 37. A transmission belt 46 is disposed between the pulley 45 and a pinion 47 of the motor 21 (FIG. 2) for transmitting the motion from the latter directly to the mandrel 31 and through the medium of the reversing wheel 40 to the mandrel 32.

The insertion devices 22 and 23 are disposed one above and the other below the frame 20 and they each comprise two lateral arms 49 and 50 parallel to one another and pivoted on lugs 51 on the frame 20. The arms 49 and 50 are interconnected by a crosspiece 52 (FIG. 1) and are grooved to form internally parallel guides 53 and 55, respectively, terminating in a flared lead-in 56 (FIG. 2) and in which the disc cover 10 can slide. Two tension springs 57 are stretched between a pin 59 on the frame 20 and pins 60 on the arms 49 and 50 and normally hold the two insertion devices 22 and 23 so that they bear on two blocks 58 of the frame 20 to hold the insertion devices 22 and 23 normally substantially parallel to the frame 20.

Above the insertion device 22 and below the insertion device 23, fixed to the arms 49 and 50, is arranged a spider 61 provided with four arms 62 forming a cross and adapted to support a centring device 63, each of these centring devices being adapted to co-operate with the corresponding mandrel 31, 32 for the purpose of positioning the flexible disc 11 correctly and accurately.

Each centring device 63 (FIG. 4) comprises a central hub 65 provided with four arms 66 (FIG. 1) at 90° to each other. To the ends of each of the arms 66 is attached a tension spring 67 which has its other end attached to the spider 61. Rotatable on the hub 65 (FIG. 4) through the medium of a bearing 69 is a counter-mandrel 70 having a conical cavity 71 adapted to co-operate with the corresponding conical end 35, 36 of the mandrels 31 and 32. Inside the hub 65 there is arranged a coaxial pin 72 having a domed end 73 urged by a compression spring 75, against the spider 61, and an end 76 provided with a stop collar 77 adapted to limit the travel of the pin 72.

Each of the insertion devices 22 and 23 can adopt two stable positions, a working position and an insertion position, under the control of flaps 80 and 81, respectively (FIG. 2). Each of the flaps 80 and 81 is pivoted at its lateral ends, in correspondence with the arms 49 and 50, to support plates 82 on the frame 20 and is provided with two levers 83 (see also FIG. 1) each bearing at one end a roller 85 adapted to co-operate with an edge of the arms 49 and 50 which is adjacent the frame 20. This edge is disposed in the front terminal portion 86 of the arms 49 and 50 and is shaped so as to form a seat 87 in which the corresponding roller 85 engages to hold the insertion device 22 or 23 in the stable insertion position, which is inclined with respect to the frame 20, by overcoming the action of the corresponding spring 57. In FIG. 2 the devices 22 and 23 can be clearly seen in the insertion and working positions respectively.

The positioning mechanism 25 (FIG. 1) comprises a stepping motor 90 fixed to the frame 20 and a lead screw 91 integral with the shaft 94 of the stepping motor 90 and rotatable in a bore through the frame 20. A corresponding lead nut 92 on the screw 91 has a lateral arm 93 slidable on a guide rod 96 parallel to the screw 91.

Arranged on the lead nut 92 (FIG. 4), one on top and the other underneath, are the magnetic transducer heads 26 and 27, respectively, for writing on, reading and, if necessary, erasing the magnetic discs 11, only one of which is indicated in FIG. 4 for each disc. The distance between the working planes of the heads 26 and 27 is substantially equal to the distance between the surfaces 34 and 38 of the mandrels 31 and 32.

A guide bush 100 slidable on the shaft 94 is connected to the nut 92 by arms 101 and 102 (FIG. 1) and bears at the top and bottom a pair of lugs 104 at the ends of which presser arms 103 and 105, respectively (FIG. 4), are pivoted by means of pins 106. These arms 103, 105 are provided at one end with a felt pad 107 adapted to co-operate with the unmagnetized surface of the disc 11 to press it against the corresponding magnetic head 26, 27. Torsion springs 109 wound around the pins 106 supply a predetermined load to the presser arms 103 and 105.

Between the inner surfaces of the envelope 10 and the disc 11 there is normally interposed a special sheet of paper having a low coefficient of friction for cleaning the disc in the zone adjacent the slots 15. For a more effective action of this cleaning power, it is appropriate to press the outer walls of the envelope 10 on to the surface of the disc 11. To this end, the apparatus is equipped with a pair of movable shoes 110 and 111 (FIG. 5) each provided with a felt pad 112 adapted to co-operate with a surface of the corresponding cover 10 to press the opposite surface of the cover 10 against a corresponding fixed shoe of a pair of shoes 113 supported by the frame 20.

The movable shoes 110 and 111 are connected to armatures 115 and 116 of two electromagnets 117 and 119, each mounted on the spider 61 of one of the insertion devices 22 and 23. Moreover, each movable shoe 110 and 111 normally co-operates with a projection 121 of each of the presser arms 103 and 105 through the action of the corresponding springs 109. Springs 120 which act on the movable shoes 110 and 111 and the action of which predominates over the action of the springs 109 on the arms 103 and 105 normally hold the shoes 110 and 111 spaced from the fixed shoes 113 and the felt pads 107 spaced from the heads 26 and 27.

A suitable detecting means 122 (FIG. 1) is arranged on each spider 61, offset with respect to the control screw 91 in dependence upon the position of the synchronizing hole 16, for co-operation therewith for the purposes hereinbefore described.

Two microswitches 123 and 125 fixed to the frame 20 are adapted to co-operate with a projection 126 of the arm 93 of the lead nut 92 to control the stopping or reversal of the stepping motor 90. The apparatus is moreover encased by a housing 128 supported by a series of posts 127 provided on the supporting frame 20.

Further electric monitoring elements not shown in the drawings may obviously be provided for detecting the position of the insertion devices 22 and 23 and whether or not a disc cover 10 is present inside each of these.

The apparatus operates in the following manner. In the inoperative position, the magnetic heads 26 and 27 are shifted fully to the right (FIG. 1), so as not to interfere with the insertion devices 22 and 23. The projection 126 of the arm 93 is in contact with the pushbutton of the microswitch 125. In this position, the electromagnets 117 and 119 are de-energized, as a result of which the movable shoes 110 and 111 are spaced from the fixed shoes 113 and the presser arms 103 and 105 are spaced from the magnetic heads 26 and 27.

Let it be assumed that it is desired to write on, and/or read, simultaneously two flexible magnetic discs 11 each contained in its own protective cover 10. The insertion devices 22 and 23 are brought into the stable insertion position by rotating the flap 80 anticlockwise and the flap 81 clockwise (FIG. 2) on the support plates 82 until both flaps, turning through 90°, are brought into a position substantially parallel to that of the frame 20. The arms 49 and 50 of the devices 22 and 23 thus rotate on the lugs 51 and dispose themselves so that they are inclined with respect to the supporting frame 20, keeping the centring devices 63 spaced from the corresponding mandrels 31 and 32.

The covers 10 containing the magnetic discs to be written on and/or read are each inserted in one of the insertion devices 22 and 23 so that the slots 15 are facing towards the magnetic heads 26 and 27. The heads 26 and 27 being opposed, the disc 11 inserted in the upper device 22 must have its writing surface facing downwardly, while the disc 11 inserted in the lower device 23 must have its writing surface facing upwardly. In this way, the holes 16 are on the same side as the detecting means 122. The operation of insertion is facilitated by the flared lead-in 56; the envelopes slide in the guides 53 and 55 until they are brought with their slots 15 in correspondence with the heads 26 and 27 and with their central holes 12 in correspondence with the mandrels 31 and 32.

By now rotating the flap 80 clockwise and the flap 81 anticlockwise through 90°, the insertion devices 22 and 23 are brought by the action of the springs 57 into the stable working position, being disposed substantially parallel to the frame 20 with the crosspiece 52 arrested by the blocks 58. In this way, the central holes 12 of the magnetic discs 11 are engaged by the outer ends 35 and 36 of the mandrels 31 and 32 (FIG. 4). At the same time, the corresponding centring devices 63 engage their conical cavities 71 with the corresponding ends 35 and 36 of the mandrels 31 and 32. The discs 11 are thus centred with respect to the mandrels 31 and 32. Moreover, in this position, the compression springs 75 supply to the counter-mandrels 70 a force lower than that exerted by the springs 57 on the insertion devices 22 and 23, but such as to clamp the discs 11 rigidly against the surfaces 34 and 38 of the mandrels 31 and 32.

Rapid and accurate centring is therefore achieved owing to the way in which the counter-mandrels 70 can float with respect to the spiders 61. To this end, each counter-mandrel 70 is connected to its spider 61 through the springs 67, which have an elasticity greater than that of the springs 75, and through the medium of the pin 72, which can slide and tilt with respect to the spider 61 because of the domed surface 73. In this way, the counter-mandrel 70 is able to shift in any direction with great ease and adapt itself perfectly to the corresponding driving mandrel, avoiding all cyclic bedding or settling movements with respect to the hub 65 and the spider 61.

After the closing of the flaps 80 and 81, that is when the discs 11 are rendered fast with the driving mandrels 31 and 32, the mandrel 31 is set in rotation through the belt 46 by actuating the motor 21. Due to the coupling produced between the two mandrels 31 and 32 by the bevel wheel 40, the motor 21 thus causes the disc 11 mounted on the mandrel 31 to rotate in one direction and the disc 11 mounted on the mandrel 32 in the mutually opposite direction. Even though the discs 11 are disposed so that they are opposed, this causes them both to rotate in the conventional direction with respect to the corresponding magnetic heads 26 and 27.

The electromagnets 117 and 119 are then energized and, overcoming the action of the springs 120, bring each of the movable shoes 110 and 111 against one surface of the corresponding cover 10 of the disc 11, pressing the other surface of the cover lightly against the corresponding fixed shoe 113. Consequently, the cleaning paper inside the cover is pressed lightly against the magnetic disc 11. The presser arms 103 and 105 are moreover released and, owing to the action of the springs 109, press the discs 11 lightly by means of their felt pads 107 against the corresponding magnetic heads 26 and 27.

The stepping motor 90, suitably driven, rotates the control screw 91 and therefore moves the lead nut 92 step by step. Consequently, the heads 26 and 27 are shifted radially with respect to the discs 11 until such time as the projection 126 (FIG. 1) actuates the microswitch 123.

When the discs 11 have been written on, and/or read, and the positioning mechanism 25 has brought the magnetic heads 26 and 27 back to the inoperative position, by operating the flaps 80 and 81 the insertion devices 22 and 23 can be brought back into the stable insertion position for withdrawing the disc covers already used and replacing them if necessary.

According to a variant of the described embodiment, the insertion devices 22 and 23 can be brought simultaneously into one of the two stable positions, the working position or insertion position, by acting on a single control mechanism 130 (FIG. 6). This mechanism 130 comprises a plate 131 which has a tongue 132 projecting from the housing 128 of the apparatus and is provided with a slot 134 engaged by a pair of guide pins 135 on the frame 20.

The plate 131 is moreover provided with two pins 136, 137 engaged in corresponding L-shaped slots 138 and 139, respectively, of two levers 140 and 141, respectively, fixed to pins 150 pivoted to lugs 142 provided on the frame 20. To each pin 150 there is moreover fixed a second lever 143 connected elastically through a spring 144 to the corresponding insertion device 22 or 23. Each lever 143 has a projection 145 adapted to co-operate with the corresponding crosspiece 52 of the devices 22 and 23.

When it is desired to position the two insertion devices 22 and 23 simultaneously in one of the two stable positions which they are able to adopt, action is exerted on the tongue 132 of the plate 131, causing the latter to slide parallel to the frame 20. Assuming that in the inoperative position the devices 22 and 23 are both in the stable insertion position, as indicated in FIG. 6, by shifting the plate 131 to the left the pins 136 and 137 slide within the L-shaped slots 138 and 139, respectively, and cause the lever 140 to rotate anticlockwise and the lever 141 clockwise, bringing the counter-mandrels 70 into engagement with the mandrels 31 and 32 (not shown in FIG. 6) in the manner already described. On continuing to shift the plate 131 to the end of its stroke to the left, the projections 145 are separated from the crosspieces 52 and the springs 144 cause the crosspiece 52 to stop against the blocks 58. In this way, both the devices 22 and 23 will be disposed substantially parallel to the frame 20 in the stable working position.

To bring the devices 22 and 23 back into the stable insertion position, the plate 131 is shifted to the right (FIG. 6) until it is brought back to the inoperative position. In this way, the lever 140 rotates clockwise and the lever 141 anticlockwise and the insertion devices 22 and 23, turning clockwise and anticlockwise, respectively, are brought back into the initial insertion position.

Figure 8:
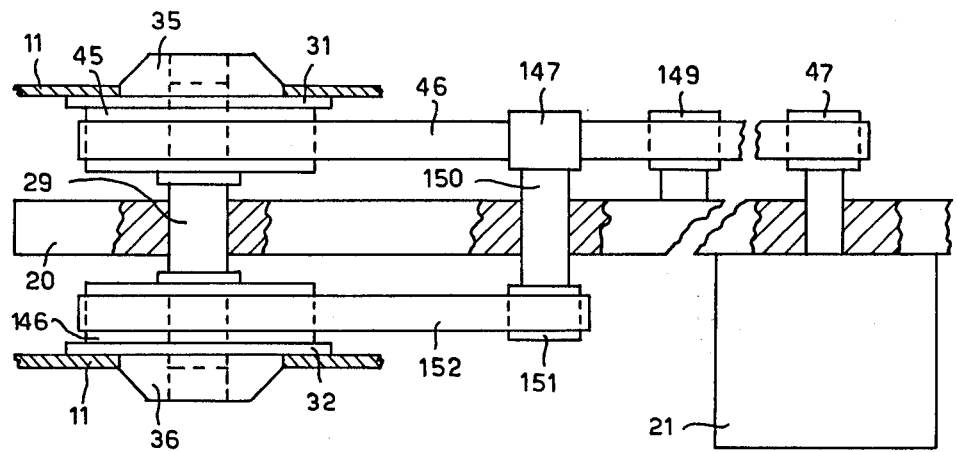
FIG. 8 is a side view, partly in section, of another possible variant of the apparatus of FIG. 1.
Figure 9:
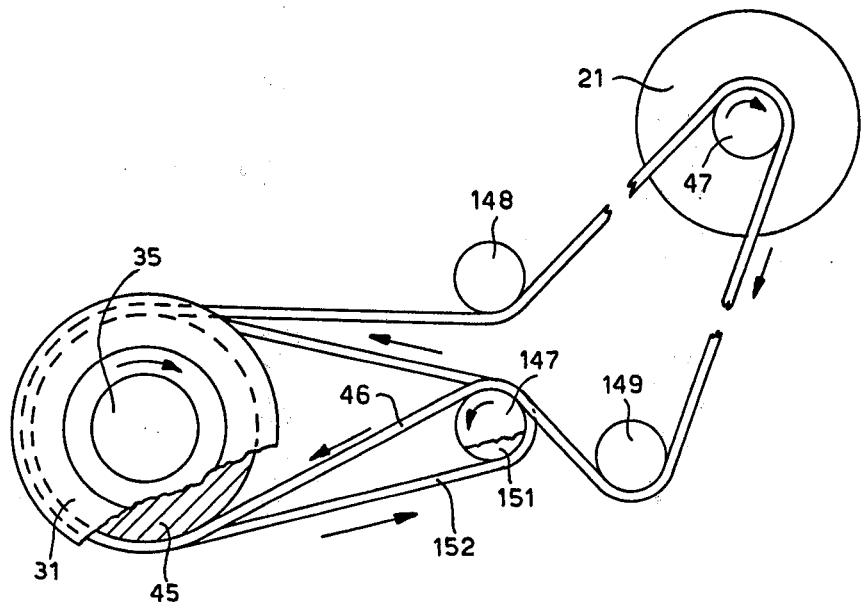
FIG. 9 is a plan view of the particular of FIG. 8.

According to another variant, the apparatus for writing on, and/or reading magnetic discs of the present invention comprises the driving belt 46 (FIG. 8), which connects the pinion 47 of the motor 21 to the pulley 45 of the mandrel 31, following a predetermined way due to the presence of three transmission pulleys 147, 148 and 149 (FIGS. 8 and 9) that are rotatable mounted on the frame 20.

In particular, the pulley 147 keyed to an end of a shaft 150 (FIG. 8) which is mounted rotatable on the frame 20, and has keyed to the other end an intermediate pulley 151 with the same diameter of the pulley 147.

Between the pulley 151 and a pulley 146 of the mandrel 32 is tightened a second driving belt 152. In this manner, when the motor 21 rotates its pinion 47, in a known manner, for example in the clockwise direction (FIG. 2), also the upper mandrel 31 rotates in the clockwise direction, while the lower mandrel 32 rotates in the anticlockwise direction. In fact both the pulleys 147 and 151, which transmit the motion to the pulley 146, rotate in the anticlockwise direction.

Furthermore, having the pulleys 147 and 151 the same diameter, the trailing speed of the belts 46 and 152 is the same, and the rotation speed of the mandrel 31 is equal and opposite to the one of the mandrel 32.

Figure 10:
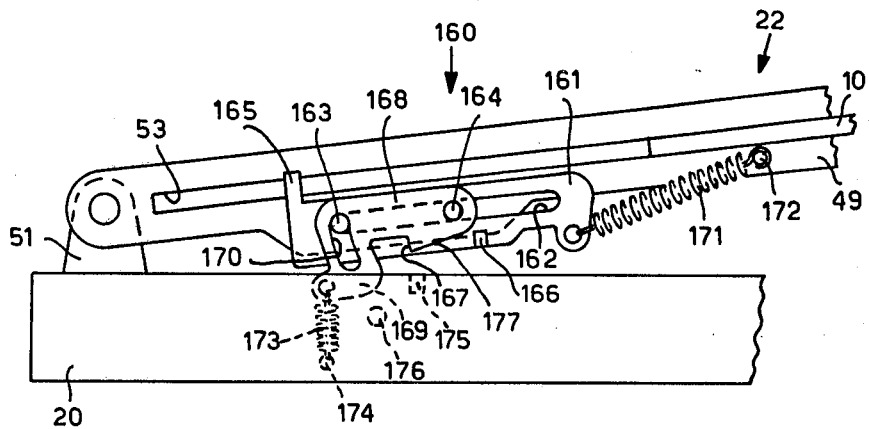
FIG. 10 is a side view, partly in section, of a further possible variant of the apparatus of FIG. 1.
Figure 11:
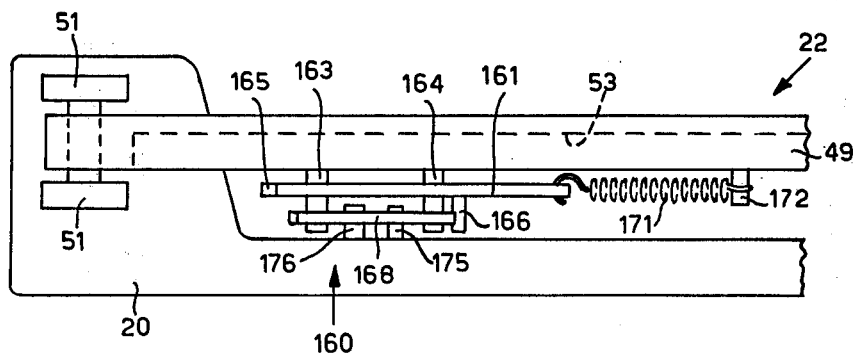
FIG. 11 is a plan view of the particular of FIG. 10.

Moreover, according to a further variant, the apparatus according to the present invention comprises two ejection mechanism 160 (of which only one is represented in FIGS. 10 and 11) for the automatic ejection of the disc cover 10 from the insertion device 22. Each one of said ejection mechanisms 160 comprises an ejection member which comprises a slide 161 sliding with its slot 162, on two pins 163 and 164 of the arm 49, parallely to the guide 53. The slide 161 is provided with an upper tooth 165, disposed in correspondence of the guide 53, and of a lateral tooth 166, adapted to co-operate with an edge 177 and an arrest 167 of an hook 168. This hook 168 comprises a lever pivoted on the pin 164 of the arm 49, which has an appendix 169 provided with a slot 170 which co-operates with the pin 163.

A spring 171 is tightened between the slide 161 and a pin 172 of the arm 49, and a spring 173 is tightened between the appendix 169 of the lever 168 and a pin 174 of the frame 20.

This latter is provided with an arrest element 175 able to co-operate with the lateral tooth 166 of the slide 161, and is provided with a release element constituted by a pin 176, able to co-operate with the appendix 169 of the lever 168. The arrest element 175 is disposed between the arrest element 167 and the tooth 166 of the same slide, in the inoperative position of the slide 161.

The operation of the mechanism 160 for the automatic ejection of the disc cover 10, hereinbefore described, is the following:

The insertion device 22, in the inoperative position, has the arms 49 inclined with respect to the frame 20 (FIG. 10). In this position the slide 161 is completely shifted at right. When the disc cover 10 is inserted into the guide 53, the slide 161 is shifted at left, by action of the same disc cover 10, which contact the tooth 165, that is on its way and, so doing, winds up the spring 171. The lateral tooth 166, shifting at left, firstly collaborates with the edge 177 of the lever 168, rotating this latter in the clockwise direction and then coupling up the arrest 167 of the same lever 168, going at the left of the arrest element 175.

When the arrest 167 has been hooked, the disc cover 10 is substantially coaxial with the corresponding mandrel 31 (FIG. 8) and the insertion device 22 (FIG. 10) can be lowered in its operation position to bear the central hole of the disc 11 to be engaged by the end 35 of the corresponding mandrel 31.

To this end the arms 49 rotate in the clockwise direction around the supports 51, until the same arms 49 are disposed parallely to the frame 20.

After a few degree rotation of the arm 49 in the clockwise direction, the lever 168 with its appendix 169 gets in touch with the pin 176. By a further rotation of the arm 49 in the clockwise direction, the lever 168, rotating in the clockwise direction against the action of the spring 173, causes the disengagement of its arrest element 167 from the lateral hook 166 which, for the action of the spring 171, shifts lightly at right to stop against the fixed arrest 175.

With the mechanism 160 in this position, the disc 11 is written on and/or read in every known manner.

To draw out the disc cover 10 from the corresponding insertion device 22, the arms 49 are rotated in the anticlockwise direction.

After a few degree rotation, the lateral tooth 166 disengages from the fixed arrest 175 and the slide 161 returns at right in the inoperative position, for the action of the spring 171. Consequently the tooth 165, co-operating with the inner edge of the disc cover 10, carries out the automatic ejection of the same cover 10 from the insertion device 22.

While the invention has been described and illustrated in detail it is to be understood that many modifications and variations of the present invention will be apparent to those skilled in the art. For example the apparatus may be employed for writing on and/or reading a plurality of flexible magnetic discs disposed, in pairs, as herebefore described.

What we claim is:

1. An apparatus for writing on and/or reading simultaneously two magnetic discs of flexible type, each disc including a single magnetizable surface having a plurality of substantially circular tracks concentric therebetween wherein binary information is serially storable following a predetermined circular order, each one of said discs being contained in a protective cover provided with a transducing aperture disposed radially relative to the enclosed disc to expose a portion of said magnetizable surface, wherein each one of said discs is rotatable inside the corresponding cover in a predetermined direction of rotation around a rotational axis to present said binary information in said predetermined order in front of said transducing aperture; said apparatus comprising:

supporting means for supporting the protective covers of said two discs such that the magnetizable surfaces of said two discs are in spaced substantially parallel planes with said transducing apertures in spaced opposed relationship to one another;

two mandrels for rotating said two discs in said parallel planes;

two transducing heads associated with said mandrels for writing on and/or reading said binary information, said heads being interposed between said spaced planes, one of said transducing heads being engageable with the magnetizable surface of one of said discs through the corresponding transducing aperture and the other of said transducing heads being engageable with the magnetizable surface of the other of said discs through the corresponding transducing aperture;

a single carriage disposed between said spaced planes;

guiding means for guiding said carriage along a radial axis parallel to said transducing apertures and interposed between said spaced planes;

means mounting said heads on said carriage, said mounting means supporting each said head faced towards its respective said disc, said heads not being cantilevered with respect to the carriage and being at a minimum distance from said radial axis;

positioning means connected with said carriage for positioning said two heads with respect to said tracks of said two discs along said transducing apertures; and a single driving means for rotating said mandrels in opposite directions, so that the magnetizable surface of each disc rotates in said predetermined direction of rotation with respect to its respective head to present said binary information in said predetermined order whereby the two discs are interchangeable therebetween.

2. An apparatus according to claim 1 further comprising a frame having two opposite sides from which said mandrels project and wherein said supporting means comprises a pair of insertion devices each one movable with respect to one corresponding of said mandrels between a working position and an insertion position, wherein the corresponding disc carried thereby is respectively in engagement with and clear from the corresponding mandrel, said insertion devices being disposed at the opposite sides of said frame, and each one of said insertion devices comprising a pair of guide arms for slidingly receiving one of said protective covers and which are pivoted on said frame, and further comprising a single control element for bringing the insertion devices simultaneously from one to the other of said two positions, wherein said single control element comprises a plate slidable with respect to said supporting frame, said plate bearing two pins opposed with respect to said frame, two levers each one having a slot associated with one of said pins, said lever being pivoted on said frame at the opposite sides thereof, cam means carried by said levers and cooperative with said pair of guide arms, and spring means keeping the cam means of said levers normally in contact with said pair of guide arms, for causing pivoting of said pair of guide arms upon sliding of said plate.

3. An apparatus according to claim 1, wherein each one of said covers has a hole located on one side of said cover for identifying the side thereof corresponding to said magnetizable surface of the enclosed disc, said apparatus further comprising a photosensing assembly for sensing the presence of said hole, said photosensing assembly comprising first and second radiation sources and first and second photoelectric signal generating means responsive respectively to the radiation of said first and second sources passing through the holes of each of said two protective covers supported by said supporting means, said first and second sources and said first and second generating means being disposed, respectively, at opposite sides with respect to said median axis, whereby both said generating means are actuated by said first and second sources only when said two protective covers are disposed in said supporting means with the magnetizable surfaces of the enclosed discs opposed therebetween.

4. An apparatus according to claim 1 wherein said driving means includes a motive shaft, and intermediate transmission elements connecting for rotation said motive shaft with said two mandrels, a base member rotatably supporting said two mandrels at opposite sides thereof, each one of said two mandrels having a first portion for the engagement with the corresponding one of said two discs and a second portion facing towards said base member, wherein said second portion is in the form of a substantially frusto-conical surface and wherein said intermediate transmission elements comprise means operatively connecting said motive shaft with one of said mandrels and a beveled wheel rotatably mounted on said base member for frictionally engaging said frusto-conical portions of said two mandrels to transmit the motion from said one mandrel to said other mandrel.

5. An apparatus according to claim 4, wherein the second portions of said two driving mandrels are shaped in form of pulleys and said transmission elements comprise a motive pulley affixed to said motive shaft, a first transmission belt connecting one of said pulleys to said motive pulley, an intermediate pulley rotated by said first transmission belt, and a second transmission belt connecting said intermediate pulley with the other of said pulleys.

6. An apparatus according to claim 5, wherein said intermediate pulley is keyed to a first end of an intermediate shaft rotatable mounted on said base member, and wherein there is provided another intermediate pulley keyed to a second end of said shaft and cooperative with said first transmission belt.

7. An apparatus for writing on and/or reading simultaneously two magnetic discs of the flexible type, each disc including a single magnetizable surface having a plurality of substantially circular concentric tracks wherein binary information is serially storable following a predetermined circular order, each one of said discs being contained in a protective cover provided with a transducing aperture disposed radially relative to the enclosed disc to expose a portion of said magnetizable surface, wherein each one of said discs is rotatable inside the corresponding cover in a predetermined direction of rotation around a rotational axis to present said binary information in said predetermined order in front of said transducing aperture; said apparatus comprising:

supporting means for supporting the protective covers of said two discs with the magnetizable surfaces of said two discs in spaced substantially parallel planes with said transducing apertures in opposed relationship to one another;

two transducing heads for writing on and/or reading said binary information, said transducing heads being interposed between said spaced planes, one of said transducing heads being engageable with the magnetizable surface of one of said discs through the corresponding transducing aperture and the other transducing head being engageable with the magnetizable surface of the other of said discs through the corresponding transducing aperture;

a single carriage disposed between said spaced planes and on which said heads are mounted faced respectively toward said two discs;

guide means for guiding the carriage slidably along a radial axis parallel to said transducing apertures;

positioning means connected to said carriage for positioning said two heads with respect to said tracks of said two discs along said transducing apertures; and driving means for rotating said two discs along said parallel planes in opposite directions, said driving means comprising:

a rotatable motive shaft;

a base member mounted between said planes;

two mandrels rotatably supported by said base member at opposite sides thereof, each said mandrel having a first portion engageable with one corresponding of said two discs for the rotation thereof and a second portion faced toward said base member, wherein said second portion is shaped in form of a substantially frusto-conical surface;

means operatively connecting said motive shaft with one of said mandrels, for the rotation thereof; and a bevel wheel rotatably mounted on said base member for frictionally engaging said frusto-conical portions of said two mandrels to transmit the motion of said one mandrel to the other mandrel.

8. An apparatus according to claim 7, wherein said bevel wheel is mounted on said base member through a spring interposed between said wheel and said base member to urge said wheel against the frusto-conical surfaces of said two mandrels.

* * * * *